(12) United States Patent
Yamada

(10) Patent No.: US 8,368,898 B2
(45) Date of Patent: Feb. 5, 2013

(54) OPTICAL APPARATUS, OPTICAL DETECTOR, OPTICAL MODULATOR, IMAGING APPARATUS, AND CAMERA

(75) Inventor: Tomohiro Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 12/852,808

(22) Filed: Aug. 9, 2010

(65) Prior Publication Data

US 2011/0043813 A1 Feb. 24, 2011

(30) Foreign Application Priority Data

Aug. 21, 2009 (JP) ................................ 2009-191971

(51) Int. Cl.
*G01N 21/55* (2006.01)
*G02B 5/26* (2006.01)

(52) U.S. Cl. ....................................... 356/445; 359/241

(58) Field of Classification Search .......... 356/445–448; 359/885, 241

See application file for complete search history.

(56) References Cited

U.S. PATENT DOCUMENTS

| 5,973,316 | A | 10/1999 | Ebbesen et al. | |
|---|---|---|---|---|
| 6,785,445 | B2 | 8/2004 | Kuroda et al. | |
| 7,898,667 | B2 * | 3/2011 | Yamada et al. | ............... 356/445 |
| 8,094,394 | B2 * | 1/2012 | Yamada et al. | ............... 359/885 |
| 2007/0196065 | A1 * | 8/2007 | Lee et al. | ....................... 385/129 |
| 2011/0128405 | A1 * | 6/2011 | Handa | ........................ 348/222.1 |
| 2011/0273771 | A1 * | 11/2011 | Oigawa et al. | ............ 359/487.04 |
| 2012/0038995 | A1 * | 2/2012 | Yamada et al. | ............... 359/885 |
| 2012/0075688 | A1 * | 3/2012 | Yamada et al. | ............... 359/241 |

FOREIGN PATENT DOCUMENTS

WO 02/08810 A2 1/2002

OTHER PUBLICATIONS

William L. Barnes, et al.; "Surface Plasmon Subwavelength Optics", Nature, vol. 424, pp. 824-830 (Aug. 14, 2003).

* cited by examiner

*Primary Examiner* — Hoa Pham
(74) *Attorney, Agent, or Firm* — Fitzpatrick, Cella, Harper & Scinto

(57) ABSTRACT

Provided is an optical apparatus having high durability, less optical absorption than a hole-type metal thin film filter, high transmittance and high reflectance, and variable optical characteristics. The apparatus includes: a dielectric substrate; a metal structure group including multiple metal structures two-dimensionally and discretely disposed at regular intervals; and a dielectric layer covering the metal structure group, in which: the metal structures have a first length equal to or shorter than a predetermined wavelength in a visible light region in one direction, and a second length equal to or shorter than the wavelength in a perpendicular direction; and the metal structures resonates with light entering the dielectric substrate or the dielectric layer, having a variable dielectric constant, to generate localized surface plasmon resonance on a surface of the metal structures to have a minimum transmittance or a maximum reflectance of the light having the wavelength.

20 Claims, 13 Drawing Sheets

OPTICAL APPARATUS, OPTICAL DETECTOR, OPTICAL MODULATOR, IMAGING APPARATUS, AND CAMERA

BACKGROUND OF THE INVENTION

1. Field of the Invention

The present invention relates to an optical apparatus, an optical detector, an optical modulator, an imaging apparatus, and a camera, and more particularly, to an optical apparatus which utilizes surface plasmon.

2. Description of the Related Art

Recently, hole-type optical filters, which have apertures arranged at regular intervals on a metal thin film and perform wavelength selection utilizing surface plasmons, have been proposed in U.S. Pat. No. 5,973,316 and Nature Vol. 424, Aug. 14, 2003 (FIG. 4).

Conventionally, the transmittance of a metal thin film having an aperture diameter equal to or less than a light wavelength is considered to be, as is varied by its film thickness, less than approximately 1%.

However, as described in U.S. Pat. No. 5,973,316, when apertures of a predetermined size are arrayed on a metal thin film at an interval that matches the wavelength of plasmons, the transmittance of light having a wavelength so as to induce surface plasmons is significantly enhanced.

Further, Nature Vol. 424, Aug. 14, 2003 teaches that transmission spectra of RGB may be obtained using this kind of hole-type optical filter utilizing surface plasmons. More specifically, according to the disclosure, transmission spectra having wavelengths of 436 nm (blue), 538 nm (green), and 627 nm (red) were obtained using a metal thin film having subwavelength aperture arrays.

Further, PCT Pamphlet WO 2002/008810 discloses a wavelength filter which utilizes a surface plasmon.

SUMMARY OF THE INVENTION

In the above-mentioned U.S. Pat. No. 5,973,316 and Nature Vol. 424, Aug. 14, 2003, by using a metal thin film having a relatively large surface area to which holes are arranged at regular intervals, a filter is realized that has a transmission spectrum dependent on the wavelength of surface plasmons induced on the metal surface.

However, in this kind of hole-type metal thin film filter, because a large proportion of space is occupied by metal, there is a large amount of optical absorption.

Therefore, in the metal thin film filter disclosed in the above-mentioned U.S. Pat. No. 5,973,316, the transmittance is about 5 to 6% even at a peak at which the transmittance is highest. When it is desired to utilize a transmission spectrum of this kind of filter having a low transmittance, it is necessary to increase the intensity of incident light in order to ensure a sufficient intensity of the transmitted light. Consequently, a device using a hole-type filter may have a low energy efficiency.

In particular, though not so high in a microwave region, the optical absorption of metal is high in a visible light region. Thus, when a hole-type metal thin film filter is used as a transmission filter for the visible light region, the scope of application to actual devices is narrowed. Similarly, when a hole-type metal thin film filter is used as a reflection filter for the visible light region, the energy efficiency becomes low due to the optical absorption.

Therefore, it is desired to provide a high-transmittance or high-reflectance optical filter in which optical absorption is less than a hole-type metal thin film filter in a waveband region including the visible light region.

In the filters described in the above-mentioned U.S. Pat. No. 5,973,316 and PCT Pamphlet WO 2002/008810, apertures or protrusions are formed on a metal film having a relatively large surface area with pitches corresponding to wavelengths of the surface plasmons, to thereby control the optical characteristics. Specifically, the surface plasmon waves having wavelengths corresponding to the pitches is selected by the interference between the surface plasmon waves propagating along this periodical structure, and the selected waves then enhances the intensities of each other to increase the intensity of the transmitted light and the intensity of the reflected light.

Therefore, in the filters described in the above-mentioned U.S. Pat. No. 5,973,316 and PCT Pamphlet WO 2002/008810, the pitches of the periodical structures become a dominant factor defining the optical characteristics of the filters. Also, when a wavelength is selected to obtain desired optical characteristics, the pitches of the periodical structures are determined depending on the wavelength.

That is, a density of the apertures or the protrusions might be restricted by the selected wavelength. It is thus difficult to increase the transmittance or reflectance or change the transmission spectrum or the reflection spectrum.

In view of the above-mentioned problem, an object of the present invention is to provide an optical apparatus, an optical detector, an optical modulator, an imaging apparatus, and a camera, which have high durability, less optical absorption than a hole-type metal thin film filter, high transmittance and high reflectance, and variable optical characteristics.

The present invention provides an optical apparatus, an optical detector, an optical modulator, an imaging apparatus, and a camera, which are structured as follows.

According to the present invention, there is provided an optical apparatus, which is an optical modulator for transmission or reflection of light having a first wavelength, the first wavelength being a predetermined wavelength in a visible light region. The optical apparatus includes; a dielectric substrate, a first metal structure group in which multiple first metal structures are two-dimensionally disposed at regular intervals on a surface of the dielectric substrate in a discrete manner in an in-plane direction; and a dielectric layer which covers the first metal structure group, in which; each of the multiple first metal structures has a first length equal to or shorter than the first wavelength in a first direction and a second length equal to or shorter than the first wavelength in a second direction that is perpendicular to the first direction, at least one of the dielectric substrate and the dielectric layer has a variable dielectric constant; and the multiple first metal structures resonates with light entering one of the dielectric substrate and the dielectric layer to generate localized surface plasmon resonance on a surface of the multiple first metal structures so that a transmittance of the light having the first wavelength becomes a minimum value, or that a reflectance of the light having the first wavelength becomes a maximum value.

Further, an optical detector according to the present invention includes the above-mentioned optical apparatus.

Further, an optical modulator according to the present invention includes the above-mentioned optical apparatus.

Further, an imaging apparatus according to the present invention includes the above-mentioned optical detector.

Further, a camera according to the present invention includes the above-mentioned imaging apparatus.

According to the present invention, it is possible to realize an optical apparatus, an optical detector, an optical modulator, an imaging apparatus, and a camera, which have high durability, less optical absorption than a hole-type metal thin film filter, high transmittance and high reflectance, and variable optical characteristics.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The inventors of the present invention focused on that conventional colored optical filters, dielectric multilayered film optical filters, biosensors, and the like have invariable or irreversible optical characteristics, and studied about elements to be the optical characteristic being variable.

Specifically, the inventors studied about a metal dot type optical apparatus in which metal structures are arranged at regular intervals on a dielectric substrate having a variable dielectric constant or in a dielectric layer having a variable dielectric constant.

A metal particle, in particular, a particle that is approximately equal to or smaller than the size of a light wavelength may generate localized surface plasmon resonance (LSPR).

Here, the term "plasmon" refers to collective oscillation of free electrons on a metal surface that is excited by an external electric field such as light. Because electrons are electrically charged, polarization occurs due to the density distribution of free electrons that is caused by oscillation of electrons. A phenomenon in which the polarization and an electromagnetic field are combined is referred to as "plasmon resonance". In particular, a resonance phenomenon that occurs between light and plasma oscillations of free electrons generated on a metal microstructure or a metal particle surface is referred to as localized surface plasmon resonance (LSPR).

Specifically, when collective oscillation of free electrons on a metal particle surface is excited by an external electric field such as light, density distribution of electrons and polarization accompanying the density distribution are generated by the oscillation. As a result, an electromagnetic field that is localized in the vicinity of the particle is generated.

Comparing filters which are equal to each other in surface area, a dot-type optical filter that includes multiple metal structures arranged (for example at regular intervals) on a dielectric substrate may reduce its metal portion in comparison to a hole-type optical filter. Therefore, the overall transmittance may be increased in the dot-type optical filter in comparison to a hole-type optical filter, because it offers a configuration that allows a substantial aperture portion to be formed large with ease while suppressing absorption of light by metal.

Figure 3A:
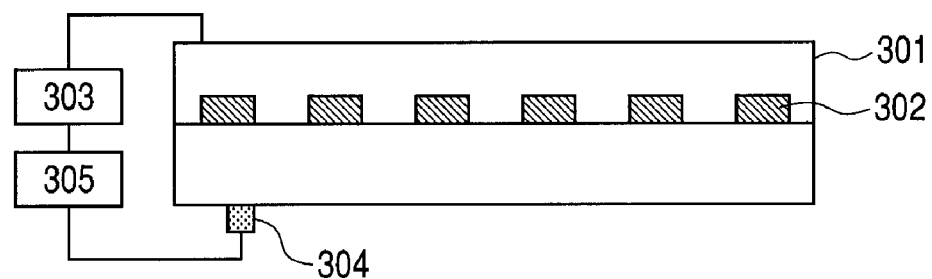
FIGS. 3A and 3B are schematic diagrams for illustrating a structure of a variable filter according to Example 6 of the present invention.

For example, FIG. 3A illustrates a schematic diagram of a dot type optical filter having multiple metals 302 provided (for example, at a certain pitch) in a dielectric substrate 301. With this structure, a transmission spectrum having a minimum value of the transmittance at a specific wavelength may be obtained. This is because light having a specific wavelength is absorbed and dispersed by localized surface plasmon resonance. Even a minute metal structure may generate LSPR, as long as the structure has a thickness of a few nanometers or larger.

The inventor of the present invention studied about an optical filter which utilizes the localized surface plasmon resonance. As a result, the inventor has found that, if at least one of the dielectric substrate and the protection layer is made of a material having a variable dielectric constant, a wavelength of the above-mentioned plasmon resonance may be varied so that optical characteristic of the optical apparatus according to the present invention may be varied.

As the material having a variable dielectric constant, there are various ferroelectrics including $LiNbO_3$, $LiTaO_3$, $SrBaNbO_3$, and $BaTiO_2$, for example. In addition, lead zirconate titanate (PZT) or the like having a piezoelectric effect may also be used. Alternately, for example, liquid crystal or the like may be arranged around the metal structure so that an orientation of the liquid crystal may be controlled by an electric field, to thereby change a refractive index around the metal structure. Still alternatively, multiple fluids having different refractive indexes may be used and the types of fluids or its physical states near the metal structure may be changed, to thereby change the refractive index around the metal structure.

Alternatively, a liquid or the like which has high refractive index nanoparticles such as titania dispersed therein may be used, so that the nanoparticles in the high refractive index a fluid may be attracted or repelled electrically or by another force with respect to the metal structure, to thereby make the refractive index around the metal structure variable.

Alternatively, another dielectric substrate or the like may be disposed in the vicinity of the metal structure, so that the refractive index around the metal structure may be changed. For example, a substrate or a thin film made of quartz or silicon nitride may be formed and disposed close to the metal structure, and a distance between the dielectric substrate and the metal structure may be controlled and changed.

For this purpose, for example, a mechanism for controlling the distance between the metal thin film structure and the substrate may be provided, or the substrate itself which has the metal thin film structure formed thereon or the dielectric substrate disposed close to the substrate may be made of a flexible material or may have a flexible structure.

With configurations described above, the optical apparatus according to the present invention may be used to form an apparatus such as an optical modulator or the like, which is reduced in size and improved in durability.

Hereinafter, embodiments of the present invention are described with reference to the accompanying drawings.

(First Embodiment)

A structure of an optical filter according to a first embodiment of the present invention is described with reference to FIGS. 1A and 1B.

Figure 1A:
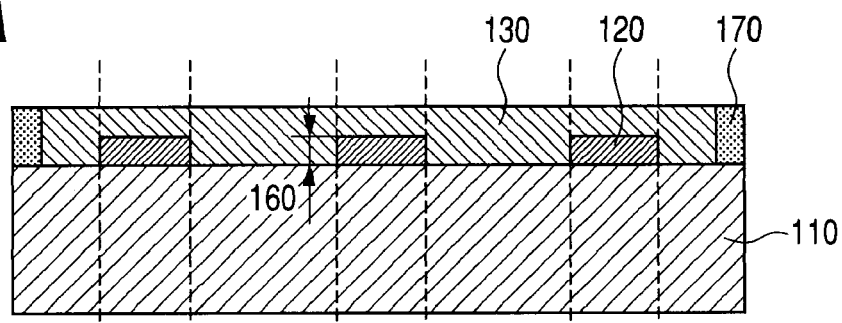
FIGS. 1A and 1B are schematic diagrams for illustrating a structure of an optical filter according to a first embodiment of the present invention.
Figure 1B:
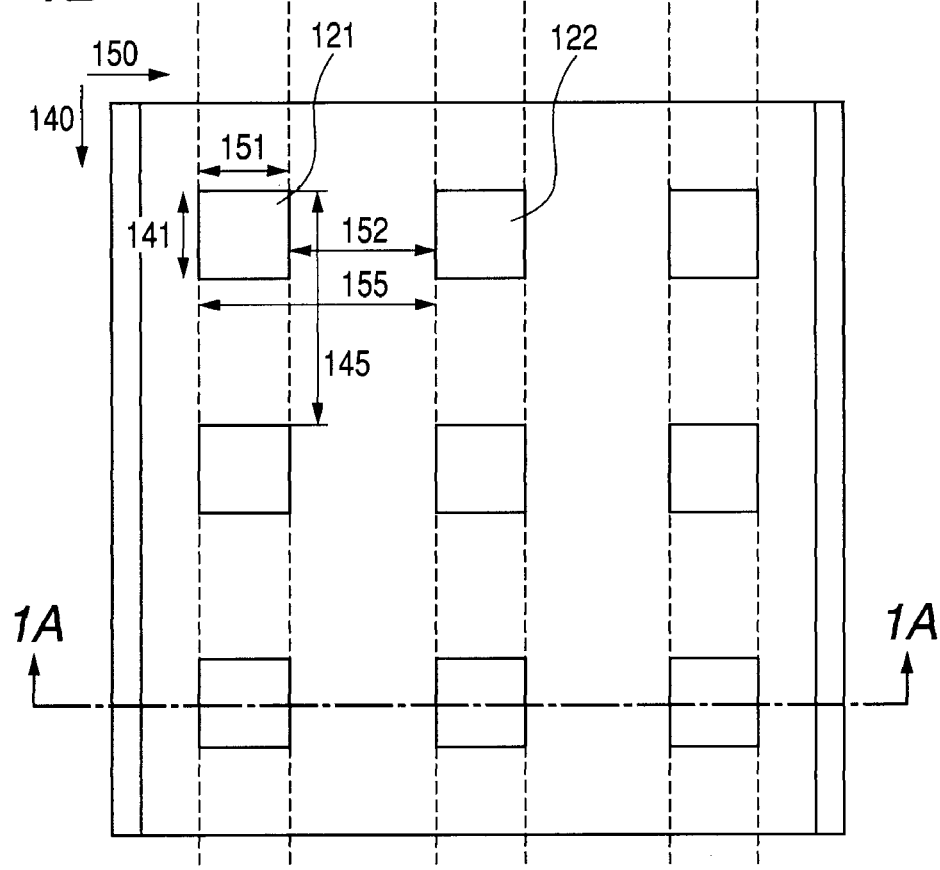

FIG. 1B is a top view of the optical filter according to this embodiment, and FIG. 1A is a cross sectional view taken along the dotted line in the top view of the optical filter.

As illustrated in FIG. 1A, on a surface of the dielectric substrate 110, multiple metal structures 120 are disposed, and a dielectric layer 130 is formed to cover the metal structures 120. The metal structures 120 are two-dimensionally disposed at regular intervals in a discrete manner in an in-plane direction of the dielectric substrate 110, and are configured as a metal structure group. Further, for description, two first metal structures constituting the first metal structure group are denoted by reference numerals 121 and 122.

Here, FIGS. 1A and 1B illustrates an example where the metal structures 120 are arranged at regular intervals.

In particular, the structure in which the metal structures are arranged at single regular intervals is preferable as described below. When plasmon resonance is generated, emission of electric field occurs in each metal structure. Therefore, if the metal structures are disposed in a range of the electric field emitted from each another metal structure, resonance conditions of the metal structures are affected by each other. In order to equalize the influence, the metal structures and their neighboring metal structures may be arranged at positions so as to have an electromagnetically equivalent relationship, in other words, so that all the metal structures are arranged at regular intervals identical to each other.

When the metal structures are arranged at regular intervals as described above, a mismatching of the plasmon resonance condition between the metal structures may be suppressed, and, a localized surface plasmon having the same wavelength and the same phase may be induced in each structure. As a result, a dip in a resonance peak in a transmission spectrum may be deeper and a width of the peak may be narrower. Also, generation of diffracted light may be suppressed, which reduces an effect to be exerted on a shape of transmission spectrum.

Meanwhile, when multiple metal structures are arranged too close to each other, the resonance conditions of the metal structures strongly affect each other, and there is a fear that a desirable resonance wavelength or spectrum width may not be obtained and a transmittance may be decreased. Accordingly, considering that an electrical field from the metal structure penetrates up to a distance substantially equal to the size of the metal structure itself when localized plasmon surface resonance is generated, the multiple metal structures are arranged as being separated from each other at a distance approximately equal to the size of the metal structure.

Further, the metal structures may be arranged apart from each other to such a degree that the above-mentioned penetration length does not overlap one another, namely arranged apart at a distance approximately twice or more of the size of the metal structure. On the other hand, the distance between each metal structure becomes larger to such a degree of almost three times of the size of the metal structure, the dip in a transmission spectrum becomes shallow. Accordingly, the distance between metal structures arranged at regular intervals may preferably set to be equal to or larger than the size of the metal structure itself. More preferably, the distance may be set to fall within a range from one-fold to three-fold of the size of the metal structure. Further preferably, the distance may be set to be approximately twice the size of the metal structure.

In FIG. 1B, the first metal structure 121 has a first length 141 in a first direction 140, and has a second length 151 in a second direction 150 that is orthogonal to the first direction 140. In this case, the first length 141 and the second length 151 are set to, for example, a length that is equal to or smaller than an optical wavelength in a visible light region.

Even when the wavelength of plasmons induced by the metal structure is in the mode of the lowest order (dipolar mode), the half-wavelength of plasmons is substantially the same as the size of a metal structure. Accordingly, because the size of a structure on which plasmons may be excited with, for example, visible light is shorter than an excitation wavelength of visible light, these lengths are made equal to or smaller than an optical wavelength in a visible light region. Further, the first length 141 and the second length 151 may also be set to be equal to or smaller than the plasmon resonance wavelength (the first wavelength).

FIG. 1B illustrates, as an example, the first metal structure 121 in a square shape which has the first length and the second length equal to each other. One side of the first metal structure 121 is 120 nm. However, the present invention should not be limited to this structure. For example, the side may be set to fall within a range from 60 nm to 160 nm.

The square shape is preferable from a viewpoint of easy design of the optical characteristic, but a metal having a circular shape, an ellipse shape, or other polygonal shape may also used as the metal structure. For example, a circular shape may suppress polarization dependence and forming accuracy may also be maintained easily.

The metal structure is not limited to the above-mentioned shape but may have various shapes. The first or second length may be regarded as a maximum width of the metal structure.

According to this embodiment, the transmittance of a predetermined wavelength (the first wavelength) in a visible light region exhibits a minimum value due to localized surface plasmons induced on a surface of the metal structure by resonance between light that is incident on the dielectric substrate or dielectric layer and the metal structure. The predetermined wavelength that is the first wavelength in the visible light region may be set to fall within a range from 350 nm to 750 nm, for example.

For the first metal structure group illustrated in FIG. 1B, an interval 145 and an interval 155 at which the metal structures 120 are arranged may be set to be equal to or smaller than an optical wavelength in a visible light region, and may preferably be set to be equal to or smaller than a plasmon resonance wavelength (the first wavelength). This is because, when the intervals at which metal structures are arranged are larger than the optical wavelength region of interest, diffracted light of a high order is likely to be generated and the intensity of zero-order diffracted light may decrease.

Further, the interval 145 and the interval 155 at which the metal structures 120 are arranged may be set to be smaller than a plasmon resonance wavelength (first wavelength) of the first metal structure group. This is because, when the intervals at which the metal structures are arranged take a value close to the plasmon resonance wavelength, light of a wavelength that causes Wood's anomaly combines with the plasmon resonance, with the result that a peak shape caused by the plasmon resonance sharpens and the depth of a transmittance minimum value at the resonance wavelength becomes shallow. Here, the term "Wood's anomaly" refers to a phenomenon in which incident light is diffracted by a periodic structure and the diffracted light propagates in parallel with the metal periodic structure surface as being extremely close to the surface.

In this embodiment, as an example, the intervals 145 and 155 are both set to 310 nm so as to form the optical apparatus in which the plasmon resonance is generated in the green color wavelength band and the optical characteristic is variable. However, the present inventions should not be limited to this structure. For example, the interval may be set to have a value falling within the range from 180 nm or more and 450 nm or less.

Alternatively, a space 152 between the first metal structures 121 and 122 may be set to be larger than the first length 141 and the second length 151. When the space 152 is set as described above, the enlargement of spectral peak widths or shifts in peak wavelengths that are caused by near-field interaction between metal body structures may be suppressed.

Further, a thickness 160 of the metal structures 120 may be set to be equal to or smaller than an optical wavelength in a visible light region, and may preferably be set to be equal to or smaller than a plasmon resonance wavelength (the first wavelength). The reason is that if the thickness of a metal structure is set to be too large in a micro-fabrication process when producing the filter, a manufacturing error is increased. In this embodiment, as an example, the thickness 160 is set to 60 nm. However, the present invention should not be limited thereto. For example, the thickness 160 may be set to a value falling within the range from 10 nm to 200 nm.

The material of the metal structures 120 may be made of, for example, aluminum, gold, silver, or platinum. Among these, aluminum is preferred because it is high in plasma frequency compared to silver and, with aluminum, the design of a filter with optical characteristics that cover the entire visible range is physically easy (Ag: 3.8 eV or less (325 nm or less), Al: 15 eV or less (83 nm or less)). Further, in comparison to silver and the like, aluminum is unsusceptible to oxidation and is chemically stable, and may thus stably express predetermined optical characteristics for a long interval. Further, an imaginary part of the dielectric constant of aluminum is larger than that of silver, and hence aluminum may achieve an adequate light blocking effect in comparison to silver even if the film thickness is thin, and micromachining is also easy. In addition, aluminum is extremely inactive chemically, similarly to platinum, and hence aluminum has no drawbacks such as difficulty in micromachining by dry etching.

It should be noted that the metal structures 120 may also be made of a mixture including aluminum, gold, silver, and platinum or an alloy thereof.

The dielectric substrate 110 may be made of a material suitably selected from metallic oxides such as titanium dioxide or quartz (silicon dioxide), which are materials capable of transmitting light of, for example, a visible light region, or materials that have a high transmittance such as silicon nitride. Alternatively, the dielectric substrate 110 may be made of, for example, a high polymer material such as polycarbonate or polyethylene terephthalate. Further, if a material having a variable refractive index is to be selected, ferroelectrics such as $LiNbO_3$ or $BaTiO_3$ may be used. In addition, the dielectric layer 130 may be made of a material selected appropriately from quartz (silicon dioxide), titanium dioxide, silicon nitride and the like, similarly to the dielectric substrate 110. In addition, the dielectric layer 130 may also be made of a polymer material such as polycarbonate or polyethylene terephthalate. In addition, if a material having a variable refractive index is to be selected, ferroelectrics such as $LiNbO_3$ or $BaTiO_3$ may be used.

An electric field is applied to the above-mentioned ferroelectric material. For example, when the ferroelectric material is used for the dielectric layer 130 with a normal refractive index direction 140 of the ferroelectric material and an abnormal refractive index main axis 150, an electric field is applied between electrodes 170. In this manner, the refractive index of the ferroelectric material is changed, so that the refractive index around the metal structure may be changed.

The optical characteristic of the ferroelectric material may support a high speed modulation. Therefore, the optical apparatus configured as described above may be used for an optical modulator, to thereby configure an optical modulator that may operate at high speed. It should be noted that, an electrode arrangement and a direction of crystal orientation may be selected appropriately based on a physical characteristic of the crystal. Further, the electrode arrangement may be changed appropriately also based on which one of the dielectric substrate 110 and the dielectric layer 130 uses the material having a variable refractive index. In addition, when an electrooptic crystal is used, the electrooptic crystal may be used in particular for an optical apparatus having a small area of pixel.

In order to form the optical apparatus having a variable optical characteristic according to this embodiment, at least one of the dielectric substrate 110 and the dielectric layer 130 needs to have a variable refractive index as described above.

Figure 2:
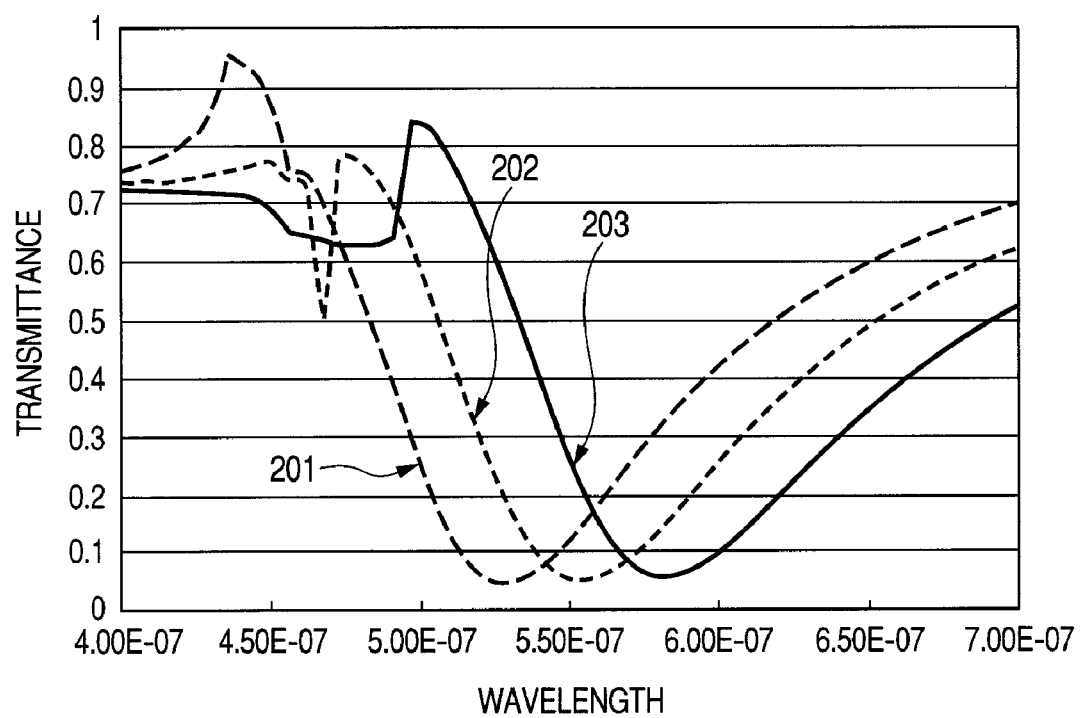
FIG. 2 is a graph illustrating transmission spectra of an optical filter according to the first embodiment of the present invention.

FIG. 2 illustrates calculation examples of the transmission spectra of the optical apparatus, in which aluminum is used as the metal structure 120, the first length and the second length are set to 120 nm, the interval is set to 310 nm, and the thickness is set to 60 nm.

When a quartz substrate is used as the dielectric substrate and a material having a refractive index of 1.4 is used as the protection layer, the transmission spectrum of the optical filter is illustrated as a transmission spectrum 201. Therefore, it is understood that the optical filter functions to strongly cut off light at a wavelength of 530 nm and its vicinity.

The wavelength of 530 nm is in the green color band. The optical filter reflects or absorbs green color wavelength light.

Therefore, magenta color, which is a complementary color of green color, is observed as the transmission spectrum.

Further, the refractive index around each of the metal structures 120 may be varied, to thereby vary the wavelength, spectral bandwidth, and intensity of the transmission spectrum.

For example, in the above-mentioned structure, a transmission spectrum 202 is obtained when the refractive index of the protection layer is 1.5, and a transmission spectrum 203 is obtained when the refractive index of the protection layer is 1.6. Thus, it is understood that the wavelength of the plasmon resonance changes depending on the refractive index around each of the metal structures 120, so that the transmission spectrum changes.

It should be noted that, a reflection spectrum of the optical filter according to this embodiment exhibits a reflectance which amounts to a maximal value in the vicinity of a wavelength at which the transmittance amounts to a minimum value. Therefore, the optical apparatus according to this embodiment may be used not only as a transmission filter but also as a reflective filter with an increased reflectance at a predetermined wavelength.

(Second Embodiment)

In this embodiment, a structural example of an optical filter which has a liquid crystal layer as the protection layer is described.

Figure 11A:
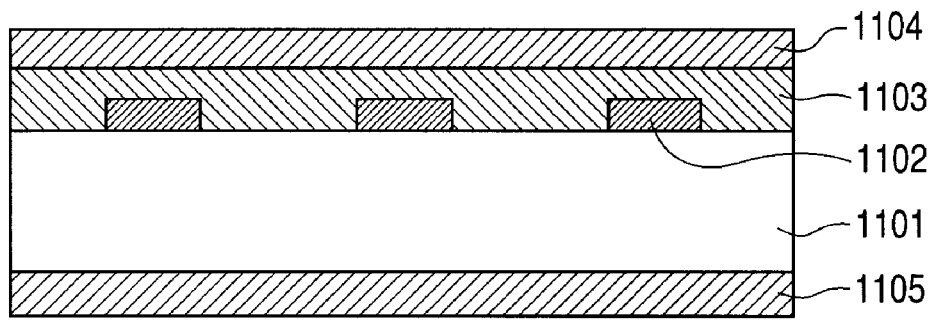
FIG. 11A is a schematic diagram illustrating a structural example according to a second embodiment of the present invention, in which a protection layer is a liquid crystal layer.

As illustrated in FIG. 11A, metal structures 1102 are disposed on a dielectric substrate 1101, and a liquid crystal layer 1103 and a transparent electrode 1104 are further disposed on and above the dielectric substrate 1101. In addition, a transparent electrode 1105 is disposed also below the dielectric substrate 1101.

In this state, an electric field is applied to the liquid crystal layer 1103 so that the orientation of liquid crystal molecules in the liquid crystal layer is changed. Thus, the refractive index around each of the metal structures 1102 is changed, to thereby change the wavelength of the plasmon resonance to be induced in the metal structures 1102.

When the liquid crystal molecules are used, each of the liquid crystal molecules has a dipole moment. Therefore, the liquid crystal molecules may be oriented, to thereby generate polarization dependence of the refractive index.

In addition, a degree and a direction of this orientation may be changed, so that the optical apparatus of the present invention may have a polarization dependence. For example, the liquid crystal molecules may be orientated in one direction, so that the refractive index depends on a polarization direction of light entering the metal thin film structures, to thereby change the value of the resonance frequency of the metal thin film structures depending on the polarization direction.

Further, the orientation of the liquid crystal molecules may be electrically controlled and changed, so that the resonance frequency may be changed with respect to each polarization.

Therefore, in this embodiment, the voltage applied to the liquid crystal layer 1103 is changed, to thereby change the optical characteristic of the apparatus disclosed in the present invention. Thus, the apparatus of the present invention may function as an optical modulator.

(Third Embodiment)

In this embodiment, a structural example of an optical filter which has a fluid layer as the protection layer is described.

Figure 11B:
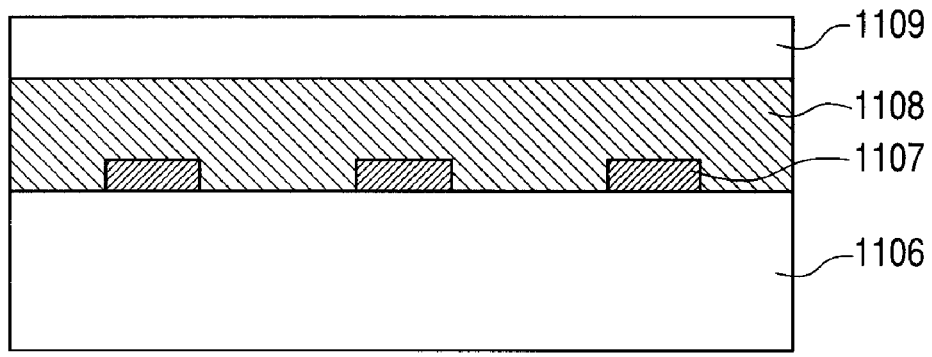
FIG. 11B is a schematic diagram illustrating a structural example according to a third embodiment of the present invention, in which a protection layer is a fluid layer.

As illustrated in FIG. 11B, metal structures 1107 are disposed on a dielectric substrate 1106, and a cover glass 1109 is disposed further thereabove, to thereby form a fluid path structure. Then, the fluid path structure is filled with a fluid 1108.

A type of the fluid 1108 flowing in the fluid path or temperature of the fluid 1108 may be changed so that a density thereof is changed, to thereby change the refractive index around each of the metal structures 1107. Thus, a wavelength of the plasmon resonance induced in the metal structures 1107 may be changed. For example, if the fluid is changed among water, ethanol, glycerol and the like, the refractive index around each of the metal structures 1107 may be changed largely, so that the wavelength of the plasmon resonance induced in the metal structures 1107 may be changed.

Therefore, according to this embodiment, a substance to be used as the fluid 1108 or a physical state such as temperature of the fluid 1108 may be changed, to thereby change the optical characteristic of the apparatus disclosed in the present invention. Thus, the optical apparatus may function as an optical modulator.

(Fourth Embodiment)

In this embodiment, a structural example of an optical filter which has a dielectric nanoparticle dispersion layer as the protection layer is described. In this structural example, the optical apparatus includes a fluid retention structure, a fluid retained by the fluid retention structure, and nanoparticles dispersed in the fluid and have dielectric constant different from that of the fluid.

Figure 11C:
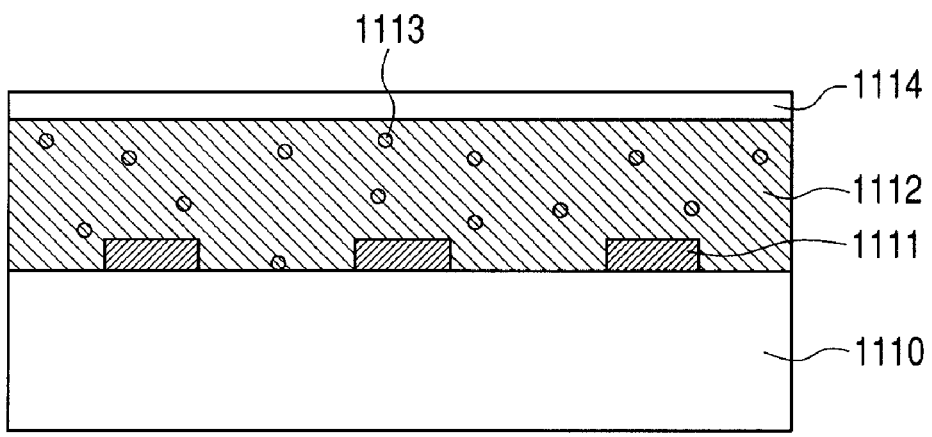
FIG. 11C is a schematic diagram illustrating a structural example according to a fourth embodiment of the present invention, in which a protection layer is a dielectric nanoparticle dispersion laye.

Specifically, as illustrated in FIG. 11C, metal structures 1111 are disposed on a dielectric substrate 1110, and a cover glass 1114 is further disposed thereabove. Then, a space between the dielectric substrate 1110 and the cover glass 1114 is filled with a fluid 1112 and nanoparticles 1113 dispersed in the fluid 1112. In addition, the nanoparticles may be electrified with the same sign by using means such as chemical modification performed on the surfaces of the nanoparticles, for example.

Then, for example, when the nanoparticles 1113 are electrified as described above, an electric field may be applied to the fluid so that the nanoparticles in the fluid may be attracted or repelled with respect to the periphery of the metal structure. Alternatively, when the surfaces of the nanoparticles are magnetized, a magnetic field may be applied to the nanoparticles so that the nanoparticles in the fluid may be attracted or repelled with respect to the periphery of the metal structure.

Through these operations, the refractive index around each of the metal structures 1111 may be changed, so that the wavelength of the plasmon resonance induced in the metal structures 1111 may be changed. Thus, the wavelength of the plasmon resonance induced in the metal structures 1111 may be changed.

Therefore, according to this embodiment, a voltage or a magnetic field to be applied to the fluid 1112 and to the nanoparticles 1113 may be changed, to thereby change the optical characteristic of the apparatus disclosed in the present invention. Thus, the optical apparatus may function as an optical modulator.

In the embodiments described above, the case where the metal structures substantially in the same shape are two-dimensionally arranged at regular intervals is exemplified, but the present invention is not limited to this structure.

For example, a so-called Bayer arrangement may be adopted, in which a size of the metal structure is different for each region, and an interval at which the metal structures are arranged is also different. Alternatively, for example, metal structure groups which are different from one another only in terms of interval at which the metal structures are arranged may be arranged in each region. Still alternatively, metal structure groups which are different from one another only in terms of size of the metal structures may be disposed in each region.

In other words, two or more first metal structure groups may be provided, which are different from each other in terms of interval at which the first metal structures are arranged, and the first metal structure groups may be disposed in different regions on the surface of the dielectric substrate.

Alternatively, a second metal structure group including second metal structures having a shape different from that of the first metal structure included in the first metal structure group may be disposed in each region. In other words, the second metal structure has a third length in the first direction 140 and a fourth length in the second direction 150. The third length is different from the first length of the first metal structure, or the fourth length is different from the second length of the first metal structure. In addition, the third length and the fourth length may be equal to or smaller than a second wavelength that is a predetermined wavelength in the visible light region and is different from a resonance wavelength of a first structure group. As a result, the second metal structure group may reduce transmittance of light having a wavelength (second wavelength) that is different from the resonance wavelength of the first structure group (first wavelength).

In this specification, the first metal structure group and the second metal structure are differentiated from each other in terms of shape of the metal structures included in the structure group. In other words, even if the interval of the metal structures is different, the term of first metal structure group is used as long as the shape of the metal structures is the same. In addition, if the shape of the metal structure is different, the term of second metal structure group is used even if the interval of the metal structure is the same.

The metal structures may be arranged, for example, in a triangular lattice pattern. In this case, unit vector components of the lattice are not perpendicular to each other, and hence the dependence of the optical characteristic of the apparatus on the polarization of the incident light may be reduced, compared with the square lattice pattern.

The above-mentioned triangular lattice pattern may be implemented by arranging multiple metal structure groups, which are arranged in a square lattice pattern, in an overlapping region. In other words, the first metal structure group constituted of the first metal structures and the second metal structure group constituted of the second metal structures may be arranged in an overlapping region.

Further, as another arrangement, the above-mentioned metal structure groups may be laminated. For example, on the dielectric substrate, the first metal structure groups are formed, which is further covered with the first dielectric layer. Then, a third metal structure group is disposed on the first dielectric layer, on which a second dielectric layer (another dielectric layer) is further formed. In this manner, there may be obtained an optical apparatus having transmission spectrum that is expressed by a product of transmission spectrums of the above-mentioned metal structure groups. The transmission spectrum of the apparatus structured as described above has two wavelengths with a minimal transmittance, and a maximum of the transmittance exists between the two wavelengths. Therefore, filters each functioning as a filter of a complementary color when used as a single layer may be laminated, to thereby obtain a filter of a primary color.

In the laminated optical apparatus according to this embodiment, another dielectric layer is formed on a dielectric layer surface. Further, the laminated optical apparatus includes a third metal structure group between the dielectric layer surface and the another dielectric layer. The third metal structure group includes multiple third metal structures which are two-dimensionally arranged at regular intervals in a discrete manner in an in-plane direction of the dielectric layer surface.

The multiple third metal structures included in the third metal structure group each have a fifth length in the first direction and a sixth length in the second direction, and the fifth length and the sixth length are each equal to or less than the third wavelength, which is different from the first wavelength. The first length and the fifth length are different or the second length and the sixth length are different, or an interval at which the third metal structures are arranged and an interval at which the first metal structures are arranged are different. Therefore, the third metal structure group may decrease transmittance at a resonance wavelength (third wavelength) that is different from a resonance wavelength (first wavelength) of the first structure group.

It should be noted that, the laminated optical apparatus of this embodiment may have dielectric layers laminated at a lamination interval at which near-field interaction almost does not arise. Specifically, the lamination interval may be 100 nm or more.

EXAMPLES

Hereinafter, examples of the present invention are described.

Example 1

Figure 4A:
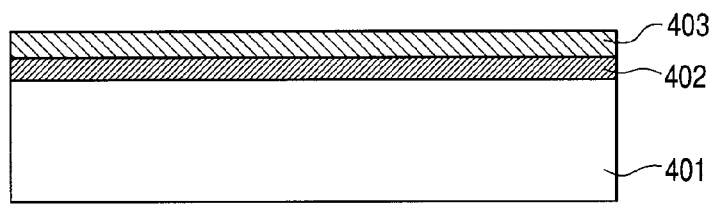
FIGS. 4A, 4B and 4C are diagrams illustrating a structural example according to Example 1 in which ferroelectrics is used for a substrate of an optical apparatus of the present invention.
Figure 4B:
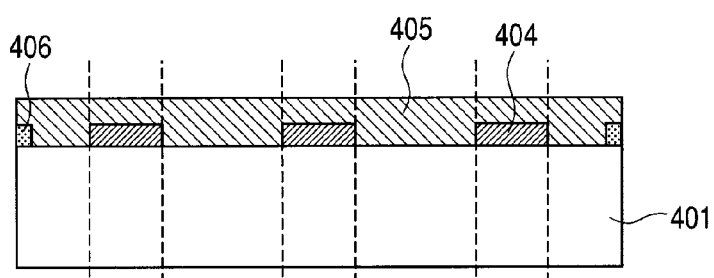
Figure 4C:
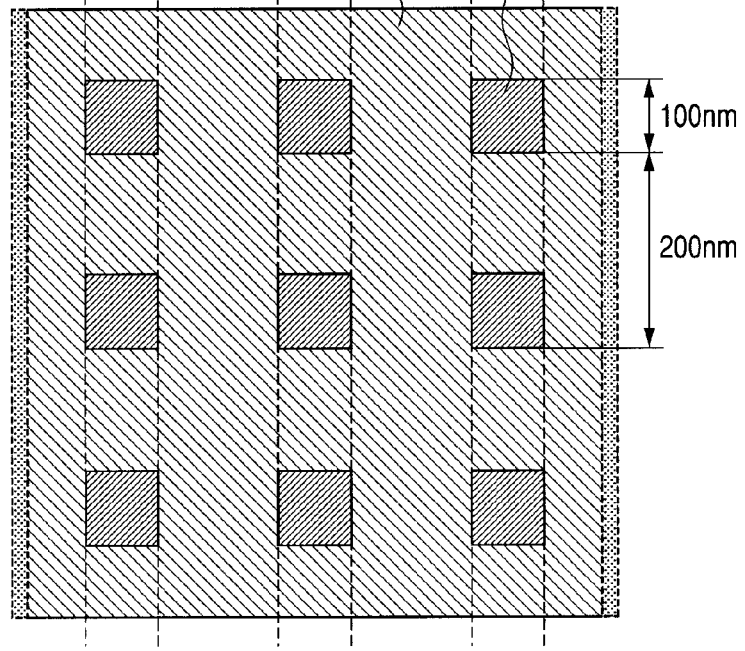

Example 1, with reference to FIGS. 4A, 4B and 4C, illustrates a structural example of the optical apparatus according to the present invention, in which ferroelectrics is used for the substrate of the optical apparatus.

FIG. 4A illustrates a ferroelectric substrate 401, a metal thin film layer 402 formed on the ferroelectric substrate 401, and a resist film 403 for electron beam (EB) lithography applied onto the metal thin film layer 402. The ferroelectric substrate 401 is made of lithium niobate ($LiNbO_3$) and has a thickness of 525 μm. The metal thin film layer 402 is made of aluminum vapor-deposited onto a surface of the ferroelectric substrate 401 to a film thickness of 60 nm. The method of forming the metal thin film layer 402 is not limited to vapor deposition, and may be sputtering or the like.

Next, the resist 403 is subjected to patterning using an EB lithography apparatus. The resist pattern is formed in a shape in which squares with sides of approximately 100 nm are arranged in a square lattice pattern at intervals of approximately 200 nm.

The metal thin film layer 402 is subjected to dry etching with plasma of a gaseous mixture of chlorine and oxygen, using this resist pattern as an etching mask, to thereby form metal thin film structures 404. In addition, electrodes 406 for applying an electric field to the ferroelectric substrate 401 are also formed simultaneously in this step. Note that the dry etching gas is not limited to chlorine and oxygen, but may be argon or other gas. In addition, a lift-off process and the like may be used.

A method of preparing an etching mask is not limited to EB lithography, and may be photolithography or the like.

The metal thin film layer 402 may be patterned by a method in which a resist pattern is formed on the dielectric substrate 401 by EB lithography or photolithography, and a lift-off process is then performed after the metal thin film layer 402 is thus formed. In addition, the metal thin film layer 402 may be formed by direct processing using a focused ion beam processing apparatus (FIB processing apparatus).

Next, a quartz thin film with a thickness of 300 nm is formed as a dielectric layer 405 on the metal thin film structures 404 by sputtering.

The optical apparatus formed as described above is illustrated in FIGS. 4B and 4C. It should be noted that the method of forming the film is not limited to sputtering, and film formation may be performed by CVD or by applying SOG or the like.

Figure 5A:
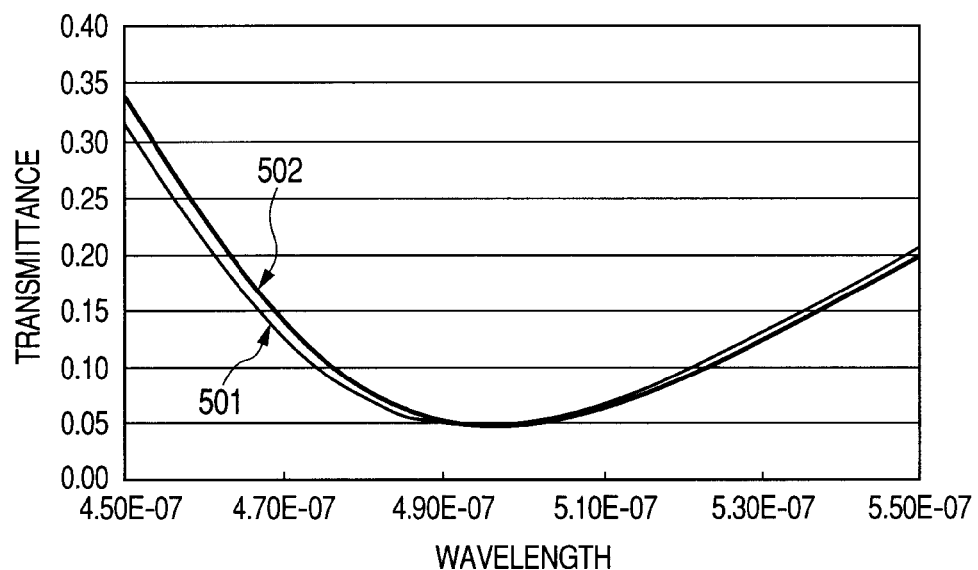
FIGS. 5A and 5B are graphs illustrating relationships between a wavelength and transmittance or reflectance obtained by an optical apparatus according to Example 1 of the present invention.

FIG. 5A illustrates transmission spectra of an optical filter manufactured as described above.

The transmission spectrum is determined as denoted by numeral 501 by numerical calculation, so that it is understood that this apparatus functions as a transmission type optical filter having a minimum value of the transmittance (absorption peak) at a wavelength of 500 nm and its vicinity. In addition, it is understood from another numerical calculation that if the refractive index of the ferroelectric substrate changes from 2.2 to 2.3, the plasmon resonance condition changes so that the wavelength at which the transmittance becomes a minimum value increases by approximately 20 nm, and the transmission spectrum 501 changes to the transmission spectrum 502. Further, it is also apparent that the optical apparatus according to this example functions as an optical modulator. In addition, the reflection spectrum of the optical apparatus according to this example has a maximum reflectance at a wavelength that is substantially the same as the wavelength at which the transmittance becomes a minimum value.

Figure 5B:
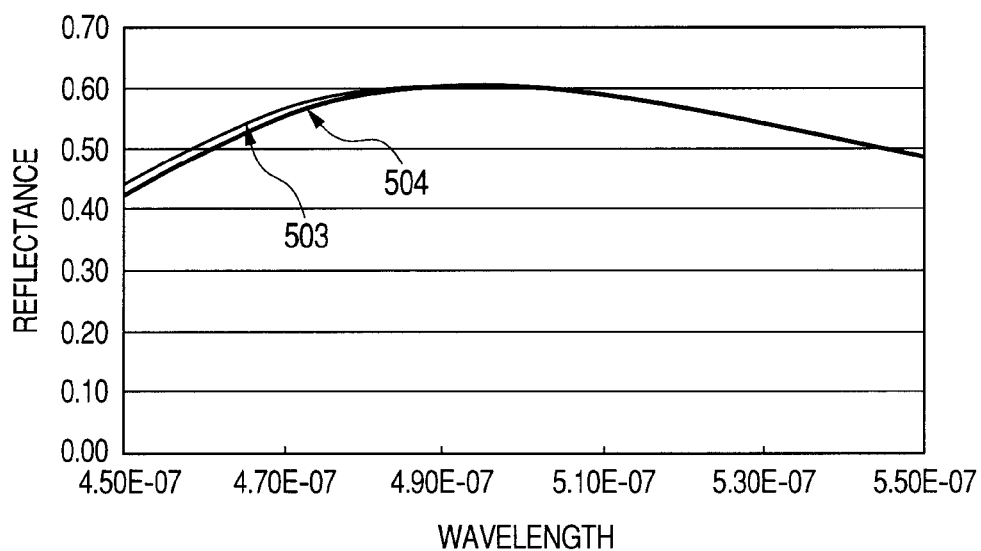

Therefore, as illustrated in FIG. 5B, the optical apparatus of this example may be used as a reflection filter. In other words, a reflection spectrum denoted by numeral 503 may be obtained from the apparatus having the transmission spectrum 501, and a reflection spectrum denoted by numeral 504 may be obtained from the apparatus having the transmission spectrum 502.

This example has been described using an example in which the metal thin film structures 404 are arranged in a square lattice pattern, but the metal thin film structures 404 may be arranged in a triangular lattice pattern. Further, the thickness of the dielectric layer 405 is not limited to 300 nm, but may be about 100 nm or more so that the area of a near-field region to be generated by the metal structures may be covered by the dielectric layer 405.

The metal thin film structures 404 are not limited to this example in which the metal thin film structures 404 each being in a square shape are arranged in a square lattice pattern. For example, the metal thin film structures 404 may be arranged in a triangular lattice pattern so as to reduce dependence of the optical characteristic on the incident polarization.

Each of the regions where the metal thin film structures are arranged may have different sizes of the metal thin film structures 404, or may have different intervals at which the metal thin film structures 404 are arranged or different lattice patterns of the arrangement.

The optical characteristic of the optical apparatus of the present invention is modulated using change in refractive index of the ferroelectric material as in this example, to thereby drive the optical apparatus at high speed.

Example 2

Figure 6A:
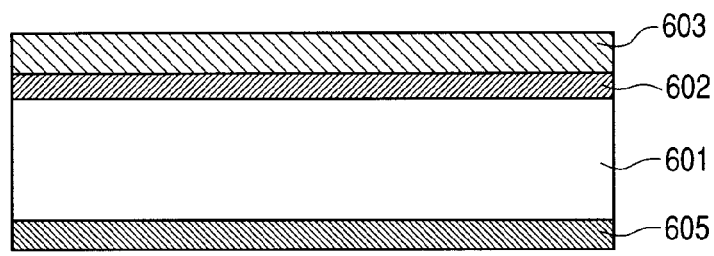
FIGS. 6A, 6B and 6C are schematic diagrams illustrating a structural example according to Example 2 in which liquid crystal is used for a dielectric layer of the optical apparatus of the present invention.
Figure 6B:
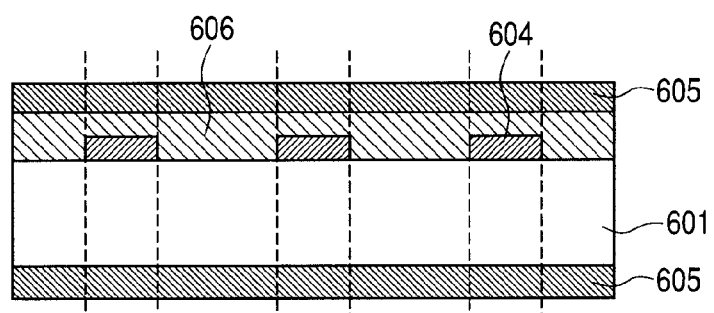
Figure 6C:
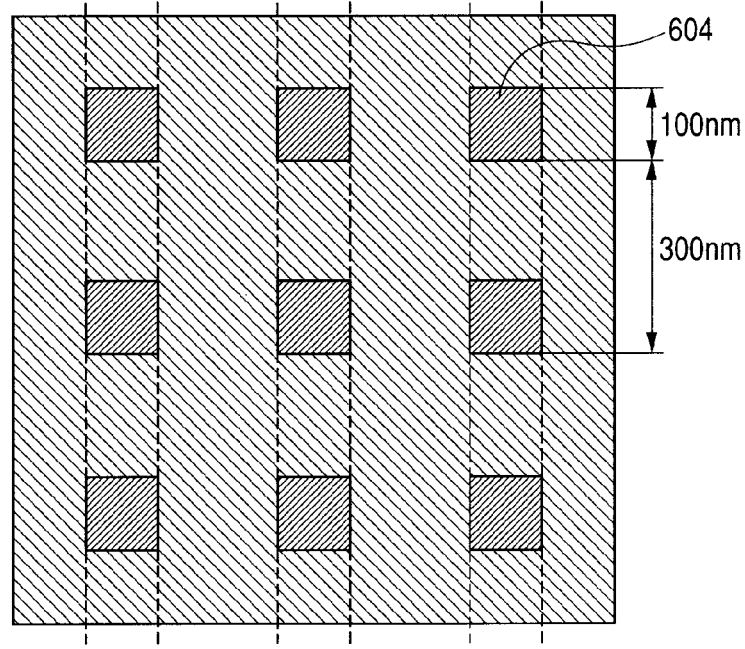

Example 2, with reference to FIGS. 6A, 6B and 6C, illustrates a structural example of the optical apparatus according to the present invention, in which liquid crystal is used for the dielectric layer in the optical apparatus.

FIG. 6A illustrates a transparent electrode 605, a dielectric substrate 601 formed on the transparent electrode 605, a metal thin film layer 602, and a resist film 603 for electron beam (EB) lithography applied onto the metal thin film layer 602. The transparent electrode 605 is made of quartz and has a thickness of 525 μm. The metal thin film layer 602 is made of aluminum vapor-deposited onto a surface of the dielectric substrate 601 to a film thickness of 30 nm. It should be noted that the film forming method of the metal thin film layer 602 is not limited to the vapor deposition, and may be sputtering or the like.

The resist 603 is subjected to patterning using an EB lithography apparatus. The resist pattern is formed in a shape in which squares with sides of approximately 100 nm are arranged in a square lattice pattern at intervals of approximately 300 nm.

The metal thin film layer 602 is subjected to dry etching with plasma of a gaseous mixture of chlorine and oxygen using this resist pattern as an etching mask, to thereby form metal thin film structures 604. The dry etching gas is not limited to chlorine and oxygen, and may be argon or another gas. In addition, a lift-off process and the like may be used. A method of preparing an etching mask is not limited to EB lithography, and may be photolithography or the like.

The metal thin film layer 602 may be patterned by a method in which a resist pattern is formed on the dielectric substrate 601 by EB lithography or photolithography, and a lift-off process is then performed after the metal thin film layer 602 is thus formed. In addition, the metal thin film layer 602 may be formed by direct processing using a focused ion beam processing apparatus (FIB processing apparatus).

Next, a liquid crystal layer having a thickness of 10 μm is formed as the dielectric layer 606 on the metal thin film structures 604, and a transparent electrode layer 605 is disposed on the dielectric layer 606. However, the forming method of the liquid crystal layer is not limited to this method.

Here, an electric field is applied between the transparent electrodes 605 so that the orientation of the liquid crystal molecules is changed, to thereby induce a change in the refractive index around the metal thin film structures 604. As a result, the wavelength of the plasmon resonance induced in the metal thin film structures 604 changes, so that the optical characteristic may be changed.

The optical apparatus formed as described above is illustrated in FIGS. 6B and 6C.

This example has been described using an example in which the metal thin film structures 604 are arranged in a square lattice pattern, but the metal thin film structures 604 may be arranged in a triangular lattice pattern. In addition, the metal thin film structures 604 are not limited to this example in which the metal thin film structures 604 each being in a square shape are arranged in a square lattice pattern. Each of the regions in which the metal thin film structures are arranged may have different sizes of the metal thin film structures 604, or have an different intervals at which the metal thin film structures 604 are arranged or different lattice patterns of the arrangement.

The optical characteristic of the optical apparatus of the present invention is modulated by using liquid crystal as in this example, to thereby increase change in refractive index around the metal thin film structures. Therefore, change in optical characteristic may be increased. Further, by taking advantage of the polarization dependence of the liquid crystal molecules, the apparatus of this example may be used in combination with a polarization plate or the like, for example, to thereby attain the optical apparatus that may control the transmittance, the polarization characteristic, or the like by using the apparatus of the present invention.

For example, the liquid crystal molecules may be orientated in one direction, so that the refractive index depends on the polarization direction of the light entering the metal thin film structure, to thereby change the value of the resonance frequency of the metal thin film structures depending on the polarization direction. Further, the orientation of the liquid crystal molecules may be electrically controlled and changed, so that the resonance frequency for each polarization may be changed with respect to each polarization.

Therefore, this apparatus may be used in combination with a band pass filter that transmits only a certain wavelength, to thereby control the transmittance of the polarization at the wavelength.

Example 3

Figure 7A:
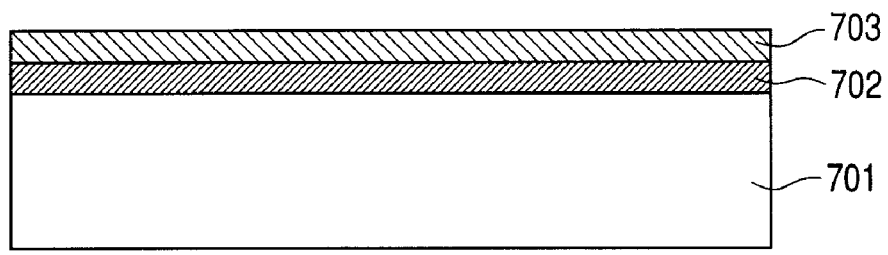
FIGS. 7A, 7B and 7C are schematic diagrams illustrating a structural example according to Example 3 in which a fluid and a fluid path structure for guiding the fluid are used for a dielectric layer of the optical apparatus of the present invention.
Figure 7B:
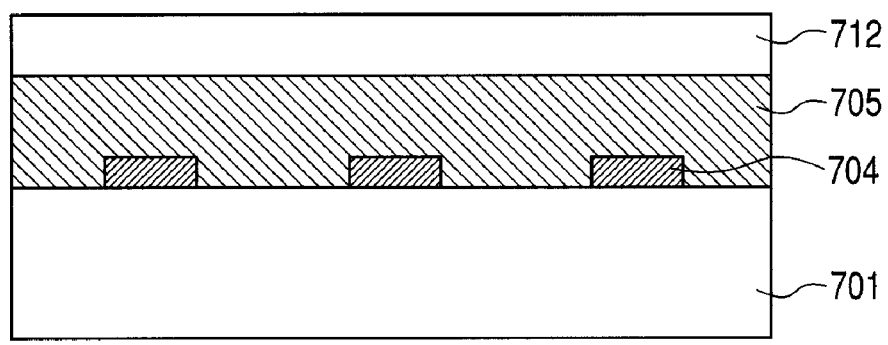
Figure 7C:
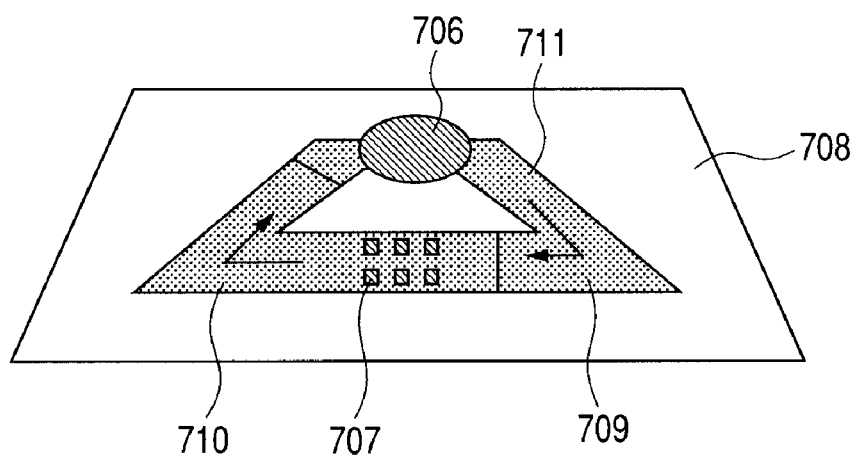

Example 3, with reference to FIGS. 7A, 7B and 7C, illustrates a structural example of the optical apparatus according to the present invention, in which a fluid and a fluid path structure for guiding the fluid are used for the dielectric layer in the optical apparatus.

FIG. 7A illustrates a dielectric substrate 701, a metal thin film layer 702 on a surface of the dielectric substrate 701 to a film thickness of 60 nm, and a resist film 703 for electron beam (EB) lithography applied onto the metal thin film layer 602. The dielectric substrate 701 is made of quartz and has a thickness of 525 μm. The metal thin film layer 702 is made of aluminum vapor-deposited onto a surface of the dielectric substrate 601 to a film thickness of 60 nm. It should be noted that the film forming method of the metal thin film layer 702 is not limited to the vapor deposition, and may be sputtering or the like.

Next, the resist 703 is subjected to patterning using an EB lithography apparatus. The resist pattern is formed in a shape in which squares with sides of approximately 100 nm are arranged in a square lattice pattern at intervals of approximately 300 nm. The metal thin film layer 702 is subjected to dry etching with plasma of a gaseous mixture of chlorine and oxygen using this resist pattern as an etching mask, to thereby form metal thin film structures 704. The dry etching gas is not limited to chlorine and oxygen, and may be argon or another gas. A method of preparing an etching mask is not limited to EB lithography, and may be photolithography or the like.

The metal thin film layer 702 may be patterned by a method in which a resist pattern is formed on the dielectric substrate 701 by EB lithography or photolithography, and a lift-off process is then performed after the metal thin film layer 702 is thus formed. In addition, the metal thin film layer 702 may be formed by direct processing using a focused ion beam processing apparatus (FIB processing apparatus). In addition, a lift-off process and the like may be used to process the metal thin film layer 702.

Next, a cover glass layer 712 is disposed on the metal thin film structures 704 so that a fluid path structure having a depth of 100 μm is provided. This fluid path structure is filled with a fluid 705. Here, the fluid 705 flowing in the fluid path is changed from the fluid A to the fluid B, so that the refractive index around each of the metal thin film structures 704 is changed from n1 to n2.

For example, when the fluid A is water, n1 is 1.33. When the fluid B is glycerol, n2 is 1.51. This change in the refractive index by replacing the fluid causes a change in the wavelength of the plasmon resonance induced in the metal thin film structures 704, so that the optical characteristic may be changed.

This operation may be realized by disposing a circulating pump in the fluid path.

The optical apparatus 708 formed as described above is illustrated in FIGS. 7B and 7C.

By a liquid sending pump 706, the fluid A 709 and the fluid B 710 that are insoluble in each other circulate in the fluid path 711. In this case, the metal thin film structure 707 is exposed to the fluid A or the fluid B so that the refractive index in the periphery changes. Thus, the wavelength of the plasmon resonance changes.

Figure 8A:
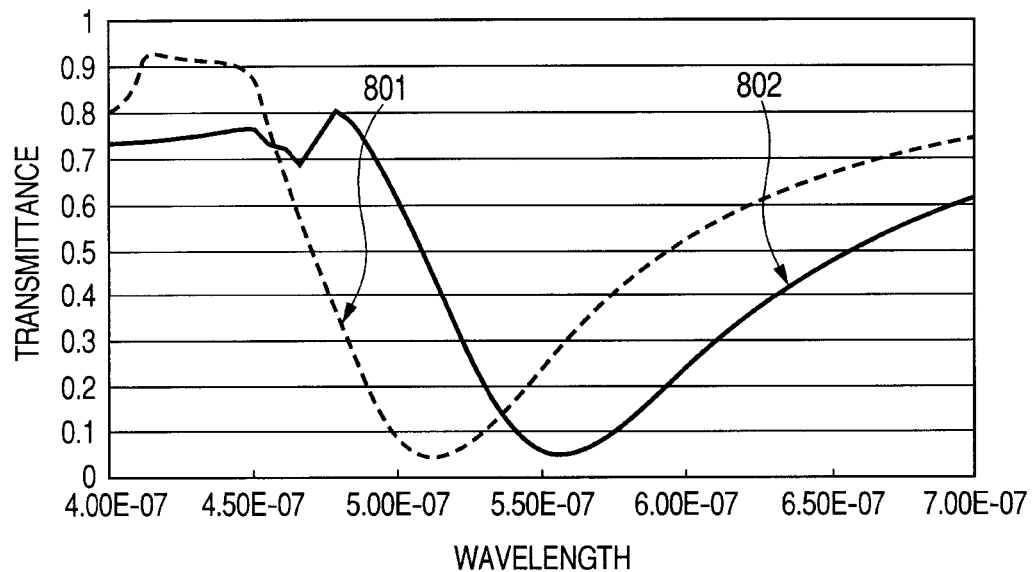
FIGS. 8A and 8B are diagrams illustrating relationships between the wavelength and transmittance or reflectance obtained by the optical apparatus according to Example 3 of the present invention.

FIG. 8A illustrates transmission spectra of the optical apparatus.

If the fluid A is water, a transmission spectrum 801 is determined by the numerical calculation. If the fluid B is glycerol, a transmission spectrum 802 is determined. It is understood that this apparatus has a function as a transmission type filter having a minimum value (absorption peak) of the transmittance at a wavelength of 510 nm and its vicinity.

Figure 8B:
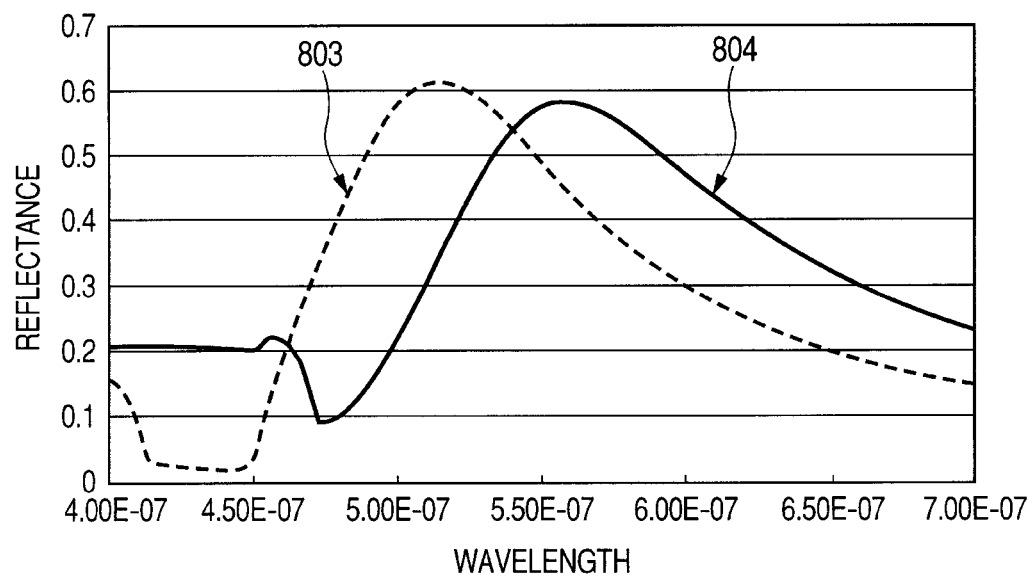

In addition, the reflection spectrum of the optical apparatus of this example has a maximum reflectance at a wavelength that is substantially the same as the wavelength at which the transmittance becomes a minimum value. Therefore, as illustrated in FIG. 8B, the optical apparatus of this example may be used as a reflection filter, so that reflection spectra 803 and 804 may be obtained from the apparatus having the transmission spectra.

This example has been described using an example in which the metal thin film structures 704 are arranged in a square lattice pattern, but the metal thin film structures 704 may be arranged in a triangular lattice pattern. Further, the metal thin film structures 704 are not limited to this example in which the metal thin film structures 704 each being in a square shape are arranged in a square lattice pattern. Each of the regions in which the metal thin film structures are arranged may have different sizes of the metal thin film structures 704, or may have different arrangement intervals at which the metal thin film structures 704 are arranged or different lattice patterns of the arrangement.

The optical characteristic of the optical apparatus of the present invention is modulated by using a fluid as in this example, to thereby increase change in refractive index around each of the metal thin film structures 704. Therefore, the change in optical characteristic may be increased.

Example 4

Example 4 illustrates a structural example of the optical apparatus according to the present invention, in which a fluid having nanoparticles dispersed therein is used as the dielectric layer in the optical apparatus. Example 4 is described with reference to FIGS. 10A, 10B and 10C.

Figure 10A:
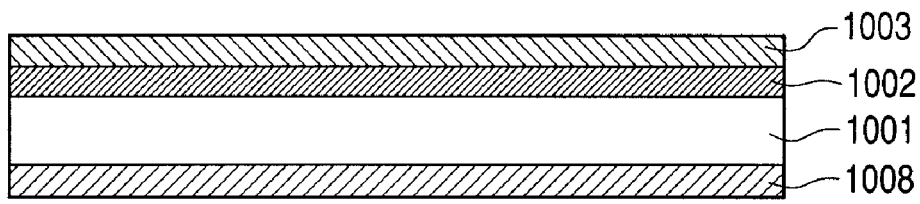
FIGS. 10A, 10B and FIG. 10C are schematic diagrams illustrating a structural example according to Example 4 in which a fluid with dispersed nanoparticles is used for the dielectric layer of the optical apparatus of the present invention.

FIG. 10A illustrates a dielectric substrate 1001, a transparent electrode 1008 formed on a surface of the dielectric substrate 1001, a metal thin film layer 1002 on the other surface, and a resist film 1003 for electron beam (EB) lithography applied onto the metal thin film layer 1002. The dielectric substrate 1001 is made of quartz and has a thickness of 525 μm. The metal thin film layer 1003 is made of aluminum vapor-deposited to a film thickness of 60 nm. It should be noted that the film forming method of the metal thin film layer 1002 is not limited to the vapor deposition, and may be sputtering or the like.

Next, the resist 1003 is subjected to patterning using an EB lithography apparatus. The resist pattern is formed in a shape in which squares with sides of approximately 100 nm are arranged in a square lattice pattern at intervals of approximately 300 nm. The metal thin film layer 1002 is subjected to dry etching with plasma of a gaseous mixture of chlorine and oxygen using this resist pattern as an etching mask, to thereby form metal thin film structures 1004. The dry etching gas is not limited to chlorine and oxygen, and may be argon or another gas. In addition, a lift-off process and the like may be used.

A method of preparing an etching mask is not limited to EB lithography, and may be photolithography or the like.

The metal thin film layer 1002 may be patterned by a method in which a resist pattern is formed on the dielectric substrate 1001 by EB lithography or photolithography, and a lift-off process is then performed after the metal thin film layer 1002 is thus formed. In addition, the metal thin film layer 1002 may be formed by direct processing using a focused ion beam processing apparatus (FIB processing apparatus).

Next, a cover glass 1007 and another transparent electrode 1008 are disposed above the metal thin film structures 1004, a fluid path having a thickness of 10 μm is provided as the dielectric layer, which is filled with a fluid 1005. The fluid 1005 may be water. Nanoparticles 1006 of titania having a diameter of 30 nm and a refractive index higher than that of water are dispersed in the fluid 1005.

Figure 10B:
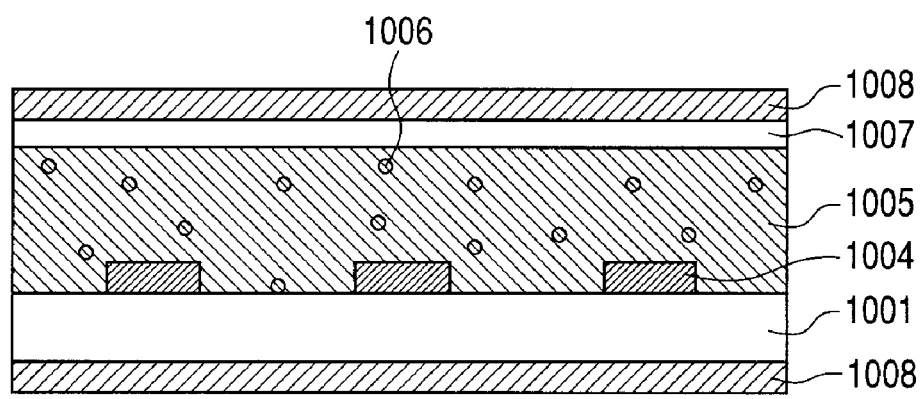
Figure 10C:
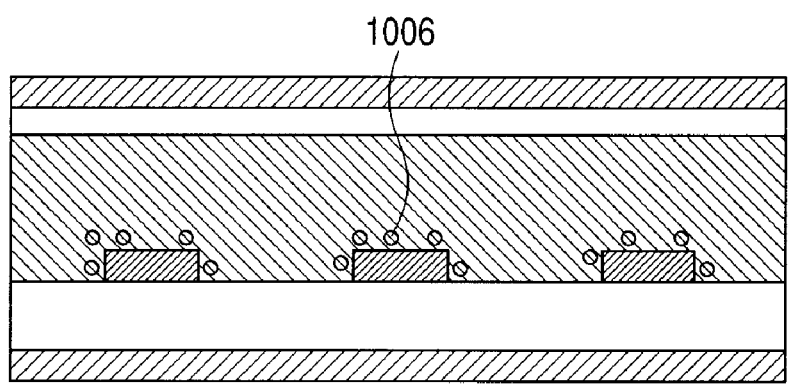

For example, by chemical modification, the surfaces of the nanoparticles may be electrified, which allows the nanoparticles to remain dispersed in the fluid (FIG. 10B).

An electric field is applied between the transparent electrodes 1008 so that the nanoparticles may be attracted to the vicinity of the metal thin film structures 1004 (FIG. 10C) and the nanoparticles may be repelled by the metal thin film structures 1004, to thereby induce a change in the refractive index around the metal thin film structures 1004.

In this manner, wavelength of the plasmon resonance induced by the metal thin film structures 1004 changes, so that the optical characteristic may be changed.

This example has been described using an example in which the metal thin film structures 1004 are arranged in a square lattice pattern, but the metal thin film structures 1004 may be arranged in a triangular lattice pattern. Further, the metal thin film structures is not limited to this example in which the metal thin film structures each being in a square shape are arranged in a square lattice pattern. In addition, each of the regions where the metal thin film structures are arranged may have different sizes of the metal thin film structures 404, or may have different intervals at which the metal thin film structures 404 are arranged, or different lattice patterns of the arrangement.

Further, the nanoparticles may be magnetized, rather than being electrified for example. When magnetizing the nanoparticles, magnetic nanoparticles or the like may be used. In this case, a magnetic field may be suitably used for migrating the nanoparticles.

The optical characteristic of the optical apparatus of the present invention is modulated by using the fluid and the nanoparticles dispersed in the fluid as in this example, so that change in refractive index around the metal thin film structures may be increased. Therefore, change in optical characteristic may be increased. In addition, intensity of the applied electric field or magnetic field may be changed, to thereby control degrees of concentration and dispersion of the nanoparticles. Therefore, the optical characteristic of the apparatus may be changed continuously.

Further, as the nanoparticles in the apparatus of this example, particles having low transmittance are used, or particles having a large imaginary part of the dielectric constant so as to control the plasmon are used. Thus, the apparatus of the present invention may also be used to form an optical apparatus which allows more advanced control to be performed on the optical characteristic, such as transmittance control, or peak width control of the plasmon resonance spectrum.

Further, in this example, the fluid and the nanoparticles having a dielectric constant different from that of the fluid are used, and the nanoparticles are handled in the fluid with respect to the metal thin film structures, so that the refractive index around the metal thin film structure is controlled. However, this example is not limited to this method. For example, the metal thin film structures may be disposed near another dielectric substrate or other object, so that the refractive index around the metal thin film structures is changed.

In addition, for example, a substrate or a thin film made of quartz or silicon nitride, a substrate made of a resin, a resin film, and the like may be used.

Example 5

Figure 9:
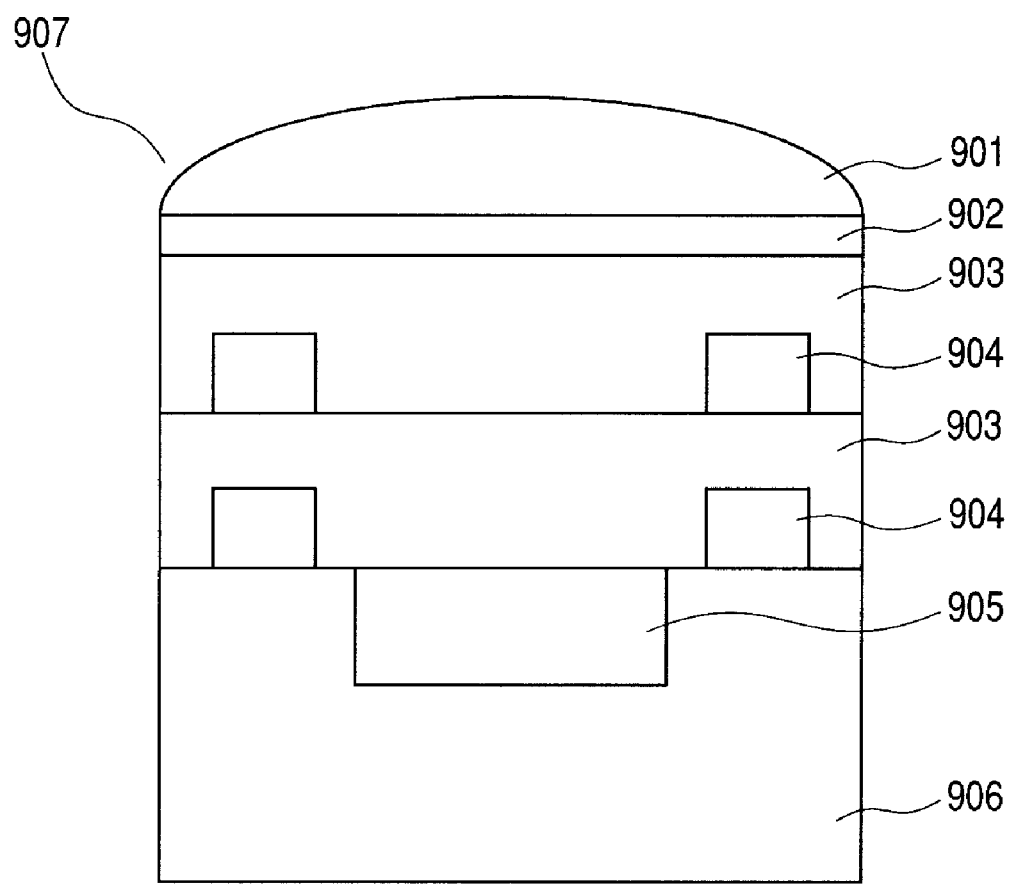
FIG. 9 is a schematic diagram of an optical detector according to Example 5 which uses the optical apparatus of the present invention.

Example 5, with reference to FIG. 9, illustrates a structural example of an optical detector using the optical apparatus described in any one of Examples 1 to 4, and an imaging apparatus including an array of the optical detector, which is incorporated into a camera.

FIG. 9 is a schematic diagram of the optical detector using the optical apparatus of the present invention. An optical detector 907 introduces a light incident from outside through a microlens 901, into a photoelectric converting portion 905. The photoelectric converting portion 905 generates a charge according to the incident light. The optical detector includes an optical apparatus 902 according to the present invention, a dielectric layer 903, electron circuits 904 and a semiconductor substrate 906, in addition to the photoelectric converting portion. The optical filter 902 includes a structure capable of inducing a plasmon resonance with respect to light, such as the metal structure 120 in FIGS. 1A and 1B.

Figure 12:
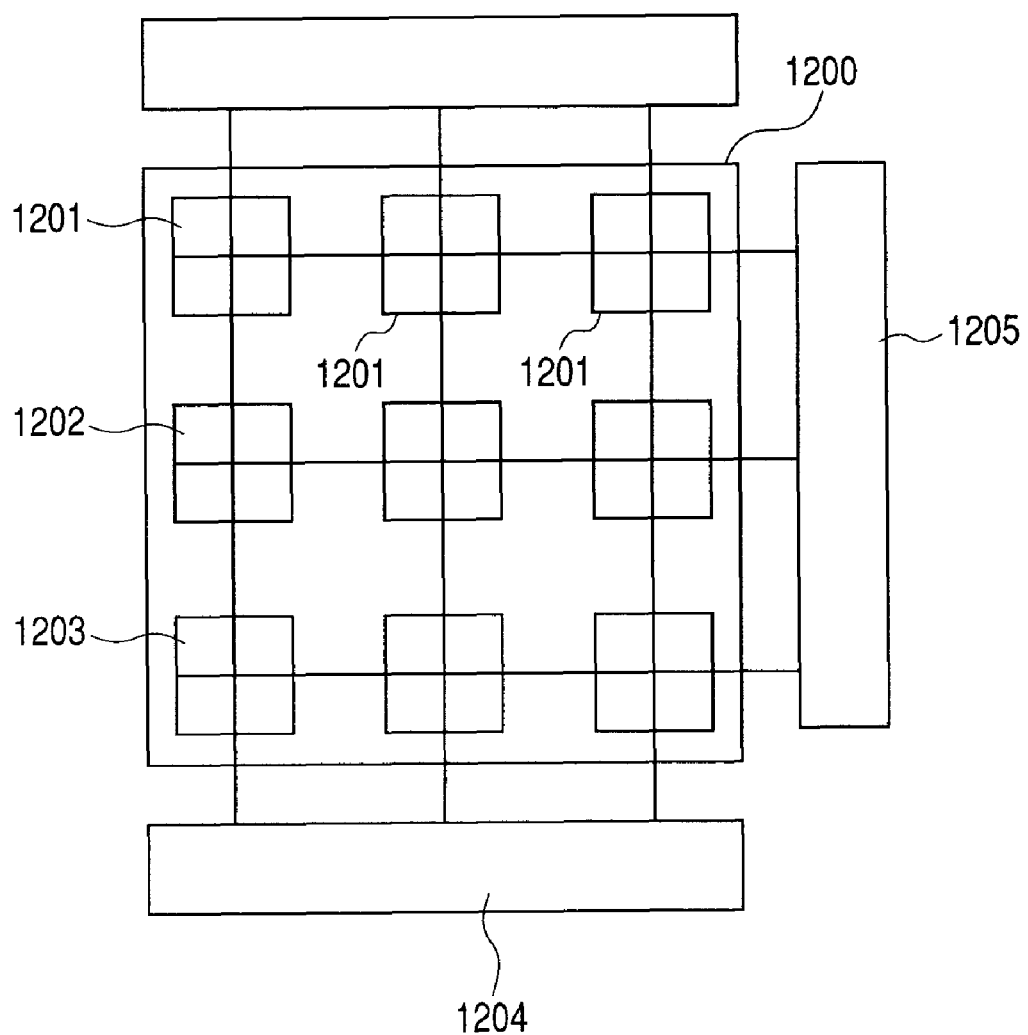
FIG. 12 is a schematic diagram of an imaging apparatus according to Example 5 which uses the optical apparatus of the present invention.

FIG. 12 is a schematic diagram of the imaging apparatus using the optical apparatus of the present invention.

FIG. 12 illustrates a pixel area 1200 which includes the above-mentioned multiple optical detectors (pixels) 1201, 1202, and 1203 arranged in a 3×3 two-dimensional matrix. Alternatively, for example, a 7680×4320 matrix may be also used, instead of the 3×3 two-dimensional matrix, as the matrix of the image area 1200 of FIG. 12.

The vertical scanning circuit 1205 and the horizontal scanning circuit 1204 in FIG. 12 are circuits for selecting an optical detector (pixel) to be read out among the whole optical detectors disposed in the pixel area 1200.

Figure 13:
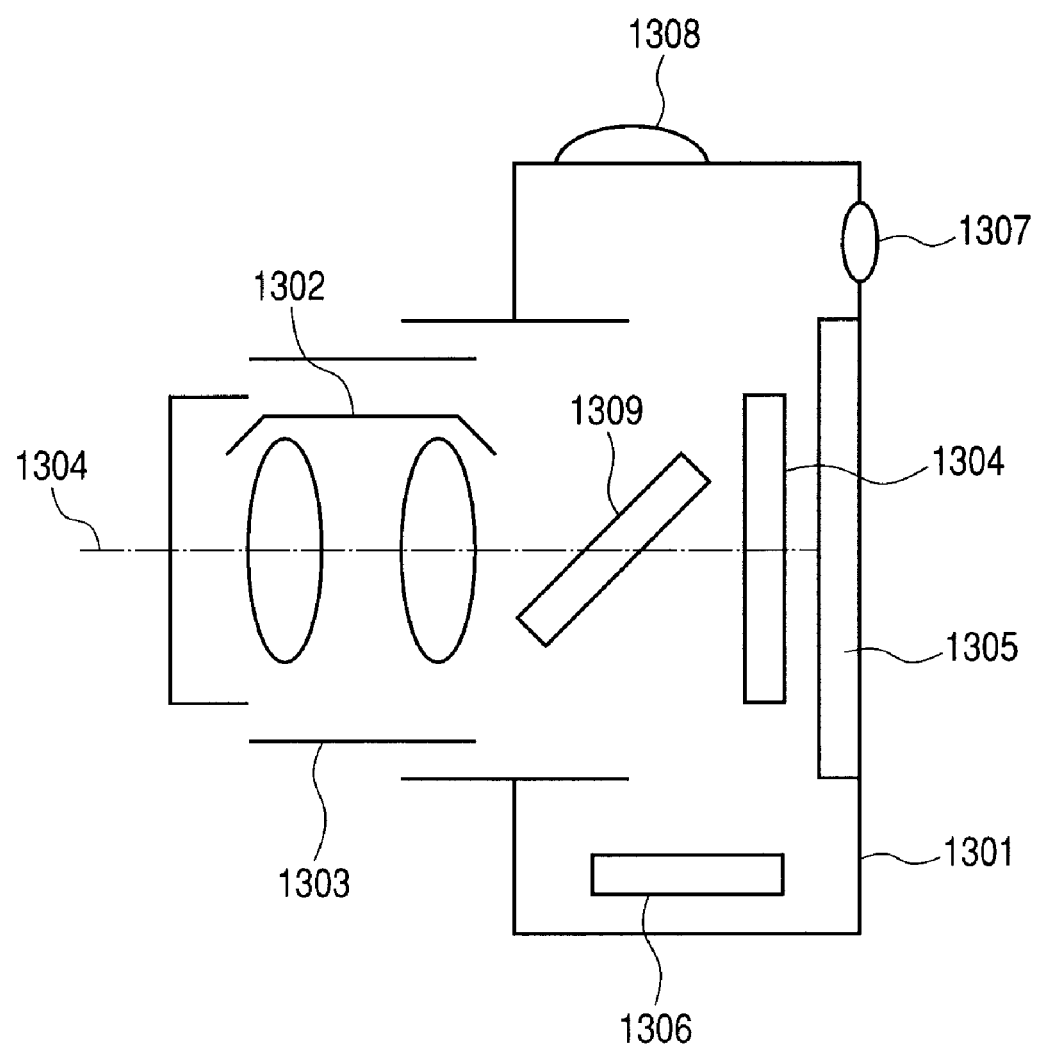
FIG. 13 is a schematic diagram illustrating a digital camera incorporating the imaging apparatus having the structure as illustrated in FIG. 12 according to Example 5 of the present invention.

FIG. 13 illustrates a schematic diagram of a digital camera into which the imaging apparatus with such a structure as illustrated in FIG. 12 is incorporated. FIG. 13 illustrates a camera body 1301, an eyepiece lens 1307, a shutter 1308, and a mirror 1309. An imaging apparatus 1304 of the present invention includes a photographic optical system (lens) 1302 disposed in a lens barrel 1303 and light is incident through the photographic optical system 1302 to the imaging apparatus 1304.

With this configuration, a charge is generated in each of the imaging apparatus 1304 according to a subject image, to thereby realize reproducing of the subject image according to the generated charge. The subject image may be reproduced on a monitoring display 1305 or may be stored in a recording medium 1306 such as a memory card.

The optical apparatus in this example is simple in manufacturing process thereof because there is no need to perform a process of dividing into different colors, unlike in a general color filter including color elements. In addition, the optical apparatus is high in durability because it is made of inorganic material. Further, the characteristic of the optical apparatus is variable, and hence color adjustment and correction of light receiving sensitivity may be performed for each pixel, so that image quality may be improved.

Example 6

Figure 3B:
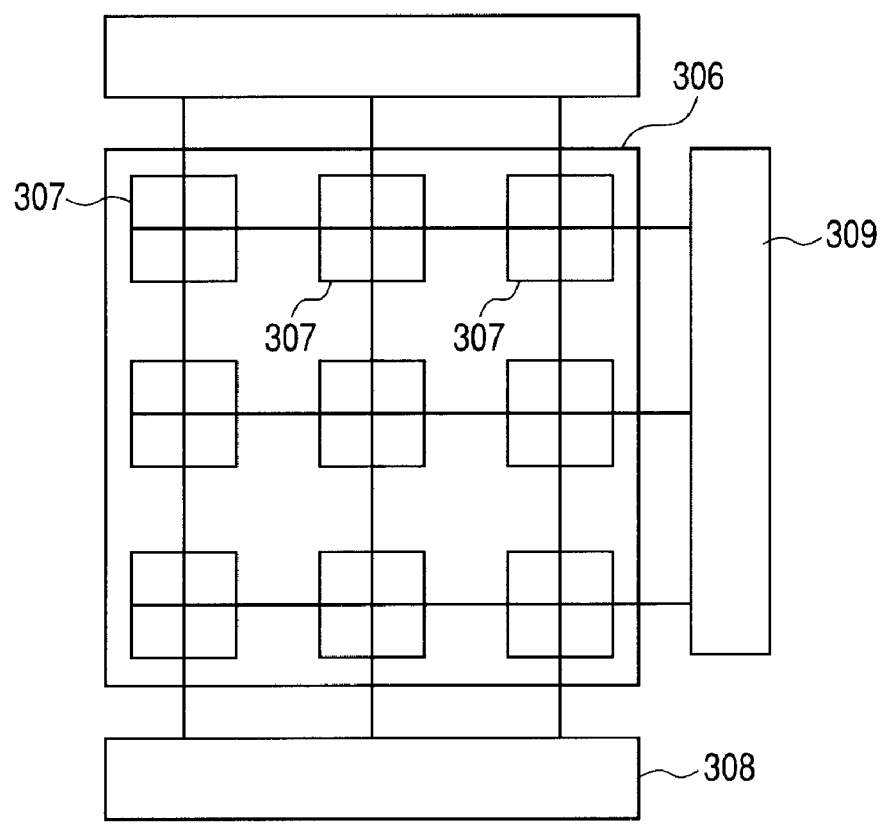

Example 6, with reference to FIGS. 3A and 3B, illustrates a structural example of an optical modulator and an optical component in which the optical apparatus described above in any one of Examples 1 to 4 is used.

FIG. 3A is a schematic diagram of a variable filter using an optical apparatus of this example.

An optical component 301 changes the transmittance of light entering from outside by the optical apparatus 302 of the present invention. The optical apparatus 302 includes a refractive index changing mechanism 303 which changes the refractive index of a medium having a variable refractive index in the optical apparatus 302, a light receiving unit 304 which monitors transmission light amount, and a feedback circuit 305 which feeds back reception light amount for transmittance control. The optical apparatus 302 includes a structure which is capable of generating a plasmon resonance with respect to light, such as the metal structure 120 illustrated in FIG. 1.

The above-mentioned optical component may be used as an optical filter having variable transmittance in the imaging apparatus or the like, for example. The optical component may also function as an optical shutter.

FIG. 3B is a schematic diagram of a space optical modulator which uses the optical apparatus of the present invention.

In FIG. 3B, a pixel area 306 includes the above-mentioned multiple optical modulators 307 arranged in a 3×3 two-dimensional matrix. Alternatively, for example, a 7680×4320 matrix may be used, instead of the 3×3 two-dimensional matrix, as the matrix of the pixel area 306 of FIG. 3B.

FIG. 3B also illustrates a vertical drive circuit 308 and a horizontal drive circuit 309 for individually driving the optical modulators arranged in the pixel area 306.

As described above, the optical apparatus to which the present invention is applied may be made of inorganic material, and hence the optical apparatus is given high durability. In addition, the characteristic of the optical apparatus may be variable so that transmittance may be changed for each pixel, for example. Therefore, when the optical apparatus is incorporated in an image pickup apparatus or the like, more complicated control may be performed on the optical characteristic of the image pickup optical system. As a result, image quality may be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-191971, filed Aug. 21, 2009, which is hereby incorporated by reference herein in its entirety.

What is claimed is:

1. An optical apparatus for transmission or reflection of light having a first wavelength, comprising:
a dielectric substrate;
a first metal structure group in which multiple first metal structures are two-dimensionally disposed at intervals on a surface of the dielectric substrate in a discrete manner in an in-plane direction;
a dielectric layer which covers the first metal structure group; and
a unit to make a dielectric constant of at least one of the dielectric substrate and the dielectric layer variable, wherein:
each of the multiple first metal structures has a first length equal to or shorter than the first wavelength in a first direction and a second length equal to or shorter than the first wavelength in a second direction that is perpendicular to the first direction; and
the multiple first metal structures resonate with light entering one of the dielectric substrate and the dielectric layer to generate localized surface plasmon resonance on a surface of the multiple first metal structures so that a transmittance of the light having the first wavelength becomes a minimum value, or so that a reflectance of the light having the first wavelength becomes a maximum value.

2. The optical apparatus according to claim 1, wherein the first metal structure group includes the multiple first metal structures disposed on the surface of the dielectric substrate at intervals equal to or shorter than the first wavelength.

3. The optical apparatus according to claim 1, wherein the first length and the second length have the same length in each of the multiple first metal structures.

4. The optical apparatus according to claim 3, wherein a shape of each of the multiple first metal structures in which the first length and the second length have the same length is a square shape.

5. The optical apparatus according to claim 1, wherein each of the multiple first metal structures has a thickness equal to or shorter than the first wavelength.

6. The optical apparatus according to claim 1, wherein each of the multiple first metal structures includes any one of aluminum, a mixture containing aluminum, and an alloy containing aluminum.

7. The optical apparatus according to claim 1, wherein at least one of the dielectric substrate and the dielectric layer includes ferroelectrics.

8. The optical apparatus according to claim 7, wherein the dielectric layer includes liquid crystal.

9. The optical apparatus according to claim 7, wherein the dielectric layer includes a fluid path and a fluid flowing therein.

10. The optical apparatus according to claim 7, wherein the dielectric layer includes a fluid retention structure, a fluid retained by the fluid retention structure, and nanoparticles which are dispersed in the fluid and have a dielectric constant different from a dielectric constant of the fluid.

11. The optical apparatus according to claim 1, wherein:
the first length and the second length are within a range between 60 nm or longer and 160 nm or shorter;
a thickness of each of the multiple first metal structures is within a range from 10 nm to 200 nm;
an interval of arrangement of the multiple first metal structures is within a range from 180 nm to 450 nm; and
the first wavelength is within a range from 350 nm to 750 nm.

12. The optical apparatus according to claim 1, wherein:
the dielectric substrate includes at least two first metal structure groups arranged in an in-plane direction;
the at least two first metal structure groups have intervals of arrangement of the multiple first metal structures different from one another; and the at least two first metal structure groups are arranged in different regions on the surface of the dielectric substrate.

13. The optical apparatus according to claim 1, comprising, the at least two first metal structure groups, and, apart from the first metal structure group, a second metal structure group in which multiple second metal structures are two-dimensionally disposed at regular intervals in a discrete manner in the in-plane direction of the dielectric substrate, wherein:
  each of the multiple second metal structures has a third length in the first direction and a fourth length in the second direction;
  the third length and the fourth length have a length equal to or shorter than a second wavelength that is different from the first wavelength, the second wavelength being a predetermined wavelength in a visible light range;
  the third length is different from the first length, or the fourth length is different from the second length;
  the first metal structure group and the second metal structure group are disposed in different regions on the surface of the dielectric substrate; and
  each of the multiple second metal structures resonates with light entering one of the dielectric substrate and the dielectric layer to generate localized surface plasmon resonance on a surface of the each of the multiple second metal structures so that a transmittance of the light having the second wavelength becomes a minimum value, or so that a reflectance of the light having the second wavelength becomes a maximum value.

14. The optical apparatus according to claim 1, comprising, the at least two first metal structure groups, and, apart from the first metal structure group, a second metal structure group in which multiple second metal structures are two-dimensionally disposed at regular intervals in a discrete manner in the in-plane direction of the dielectric substrate, wherein:
  each of the multiple second metal structures has a third length in the first direction and a fourth length in the second direction;
  the third length and the fourth length are equal to or shorter than a second wavelength that is different from the first wavelength, the second wavelength being a predetermined wavelength in a visible light range;
  the third length is different from the first length, or the fourth length is different from the second length;
  the first metal structure group and the second metal structure group are disposed in an overlapping region; and
  each of the multiple second metal structures resonates with light entering one of the dielectric substrate and the dielectric layer to generate localized surface plasmon resonance on a surface of the each of the multiple second metal structures so that a transmittance of the light having the second wavelength becomes a minimum value, or so that a reflectance of the light having the second wavelength becomes a maximum value.

15. The lamination type optical apparatus, comprising:
  the dielectric layer constituting the optical apparatus according to claim 1; and
  another dielectric layer formed on the surface of the dielectric layer, wherein:
  the lamination type optical apparatus further comprises a third metal structure group in which multiple third metal structures are two-dimensionally disposed at regular intervals between the surface of the dielectric layer and the another dielectric layer in a discrete manner in the in-plane direction of the surface of the dielectric layer;
  each of the multiple third metal structures constituting the third metal structure group has a fifth length in the first direction and a sixth length in the second direction;
  the fifth length and the sixth length are equal to or shorter than a third wavelength that is different from the first wavelength, the third wavelength being a predetermined wavelength in the visible light range;
  the first length and the fifth length are different from each other, or the second length and the sixth length are different from each other, or intervals of arrangement of the multiple third metal structures are different from the intervals of the arrangement of the multiple first metal structures;
  the localized surface plasmon resonance is generated on the surface of the each of the multiple the first metal structures so that the transmittance of the light having the first wavelength becomes a minimum value, or that the reflectance of the light having the first wavelength becomes a maximum value; and
  localized surface plasmon resonance is generated on a surface of the each of the multiple third metal structures so that a transmittance of light having the third wavelength becomes a minimum value, or that a reflectance of the light having the third wavelength becomes a maximum value.

16. An optical detector, comprising the optical apparatus according to claim 1.

17. An imaging apparatus, comprising the optical apparatus according to claim 16.

18. A camera, comprising the imaging apparatus according to claim 17.

19. An optical modulator, comprising the optical apparatus according to claim 1.

20. An optical apparatus for transmission or reflection of light having a first wavelength, comprising:
  a dielectric substrate;
  a first metal structure group in which multiple first metal structures are two-dimensionally disposed at intervals on a surface of the dielectric substrate in a discrete manner in an in-plane direction; and
  a dielectric layer which covers the first metal structure group,
  wherein each of the multiple first metal structures has a first length equal to or shorter than the first wavelength in a first direction and a second length equal to or shorter than the first wavelength in a second direction that is perpendicular to the first direction;
  wherein the apparatus operates to vary the dielectric constant of at least one of the dielectric substrate and dielectric layer, and
  wherein the multiple first metal structures resonate with light entering one of the dielectric substrate and the dielectric layer to generate localized surface plasmon resonance on a surface of the multiple first metal structures so that a transmittance of the light having the first wavelength becomes a minimum value, or so that a reflectance of the light having the first wavelength becomes a maximum value.

* * * * *